United States Patent
Dotan (12)

(10) Patent No.: US 6,250,802 B1
(45) Date of Patent: Jun. 26, 2001

(54) ELECTRONIC THERMOMETER WITH PREHEATING

(75) Inventor: Simon Dotan, Natania (IL)

(73) Assignee: HomeCare Technologies Ltd, Kowloon (HK)

(*) Notice: Subject to any disclaimer, the term of this patent is extended or adjusted under 35 U.S.C. 154(b) by 0 days.

(21) Appl. No.: 09/416,258

(22) Filed: Oct. 12, 1999

(51) Int. Cl.[7] ........................................ G01K 7/00
(52) U.S. Cl. ............................................... 374/164
(58) Field of Search ................... 374/164, 185, 374/129, 133; 340/584

(56) References Cited

U.S. PATENT DOCUMENTS

| 3,025,706 | * | 3/1962 | Oppenheim . | |
|---|---|---|---|---|
| 3,540,283 | * | 11/1970 | Dean . | |
| 4,158,965 | * | 6/1979 | Prosky | 73/362 A |
| 4,183,248 | * | 1/1980 | West | 73/362 A |
| 4,790,324 | * | 12/1988 | O'Hara et al. | 128/664 |
| 5,035,514 | * | 7/1991 | Newman | 374/164 |
| 5,923,258 | * | 7/1999 | Tseng | 340/584 |
| 6,036,361 | * | 3/2000 | Gregory et al. | 374/185 |
| 6,048,094 | * | 4/2000 | Tornare | 374/183 |

FOREIGN PATENT DOCUMENTS

03272475 * 12/1991 (JP) .

* cited by examiner

Primary Examiner—G. Bradley Bennett
Assistant Examiner—Gail Verbitsky
(74) Attorney, Agent, or Firm—Benjamin J. Barish

(57) ABSTRACT

An electronic thermometer for measuring the temperature of a body, includes a probe having a heating element for preheating the probe to the approximate temperature of the body, and a temperature measuring element for measuring the precise temperature the body. The heating element is a relatively low-resistance thermistor having a positive temperature coefficient (PTC), and the temperature measuring element is a relatively high-resistance thermistor having a negative temperature coefficient (NTC).

20 Claims, 2 Drawing Sheets

ELECTRONIC THERMOMETER WITH PREHEATING

FIELD AND BACKGROUND OF THE INVENTION

The present invention relates to electronic thermometers, and particularly to electronic thermometers having preheating devices to shorten the measuring time.

Thermistors have been widely used in electronic thermometer probes for measuring temperature. As described, for example, in U.S. Pat. No. 3,025,706, the thermistors generally used in such applications are those having a high negative temperature coefficient (NTC), i.e., having an electrical resistance which varies greatly in the negative direction with changes in temperature, as distinguished from ordinary resistors which have relatively small temperature coefficients. However, when using NTC thermistors for temperature measurement, long time intervals are generally required to make precise measurements because of the time needed for raising the temperature of the probe to that of the body whose temperature is being measured.

It is also known to shorten this time interval by preheating the probe to the approximate temperature of the body whose temperature is being measured. For example, U.S. Pat. No. 4,158,965 does this by applying auxiliary current to the thermistor to cause it to act as a heating element for raising the temperature of the probe, before the thermistor is used for making the precise temperature measurement. However, since the same thermistor is used for two functions, preheating and precise temperature measurement, its characteristics making it optimum for one function (e.g., preheating) may detrimentally affect its performance with respect to the other function (e.g., temperature measurement).

OBJECTS AND BRIEF SUMMARY OF THE INVENTION

An object of the present invention is to provide an electronic thermometer having advantages in the above respects.

According to one aspect of the present invention, there is provided an electronic thermometer for measuring the temperature of a body, including a probe having a heating element for preheating the probe to the approximate temperature of the body, and a temperature measuring element for measuring the precise temperature the body; characterized in that the heating element is a low-resistance thermistor having a positive temperature coefficient (PTC) for rapidly preheating the probe, and the temperature measuring element is a relatively high-resistance thermistor having a negative temperature coefficient (NTC) for precisely measuring the temperature of the body.

As will be described more particularly below, since a separate thermistor (of the PTC type) having a relatively low resistance is provided for the preheating function, such an electronic thermometer is inherently capable of performing the preheating function more efficiently, e.g., by reducing the time interval for preheating the probe to the body temperature; and since a separate thermistor (of the NTC type) having a high resistance is provided for its measuring function, the thermometer is also inherently capable of performing the temperature measuring function more efficiently than when both functions are performed by a single thermistor.

According to further features in the described preferred embodiment, the PTC thermistor and NTC thermistor are embedded in a heat-conductive plastic, preferably an epoxy resin having conductive particles. In addition, the heat-conductive plastic embedding the two thermistors is covered by an outer layer of an inert metal. Such an outer layer is preferably in the form of a thin coating applied directly onto the heat-conductive plastic.

According to still further features in the described preferred embodiment, the resistance at ambient temperature of the NTC thermistor is at least two orders of magnitude larger than that of the PTC thermistor. Preferably, the resistance at ambient temperature of the PTC thermistor is from 10 to 100 ohms, and that of the NTC thermistor is from 10 to 100 Kohms.

According to additional features in the described preferred embodiment, the probe is attached to a housing including a display and electrical circuitry connecting the PTC and NTC thermistors to the display for displaying the measured temperature. The electronic circuitry includes a manual control adapted to be selectively operated to selectively actuate the electrical circuitry to a Standby Mode wherein the PTC thermistor is effective to preheat the probe to the approximate temperature of the body, and to a Measuring Mode wherein the NTC thermistor is effective to measure the precise temperature of the body. In the described preferred embodiment, the manual control includes a first key manually depressible to actuate the electrical circuitry to the Standby Mode and a second key manually depressible to actuate the electrical circuitry to the Measuring Mode.

The foregoing features enable the time interval required for measuring temperature to be minimized, and/or the temperature measurement itself to be enhanced.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
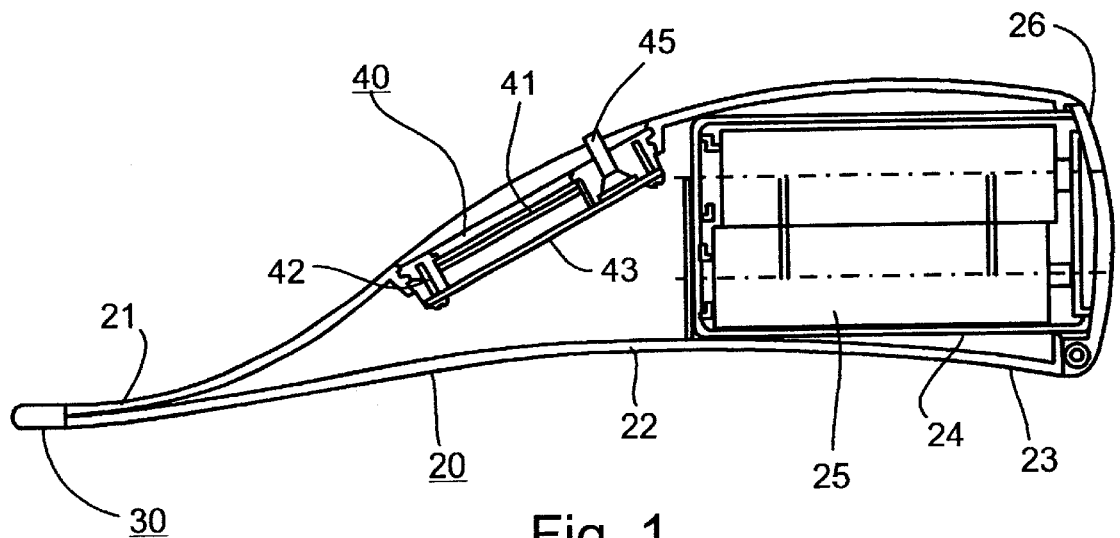
FIG. 1 is a side elevational view illustrating one form electronic thermometer constructed in accordance with the present invention and described below as a preferred embodiment thereof.

The electronic thermometer illustrated in the drawings comprises a housing 20 including a temperature probe 30 at one end for measuring the temperature of a body, and a display 40 for displaying the measured temperature.

Figure 2:
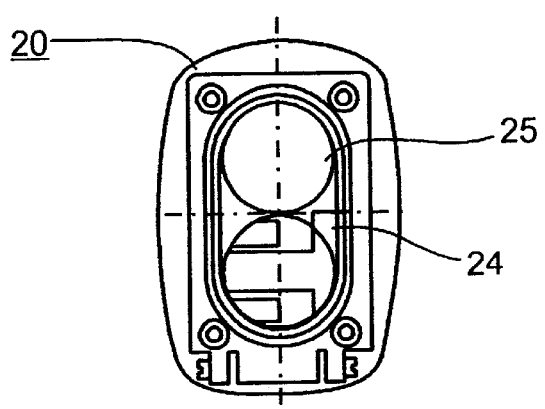
FIG. 2 is an end elevational view of the electronic thermometer of FIG. 1 with the back cover removed.
Figure 3:
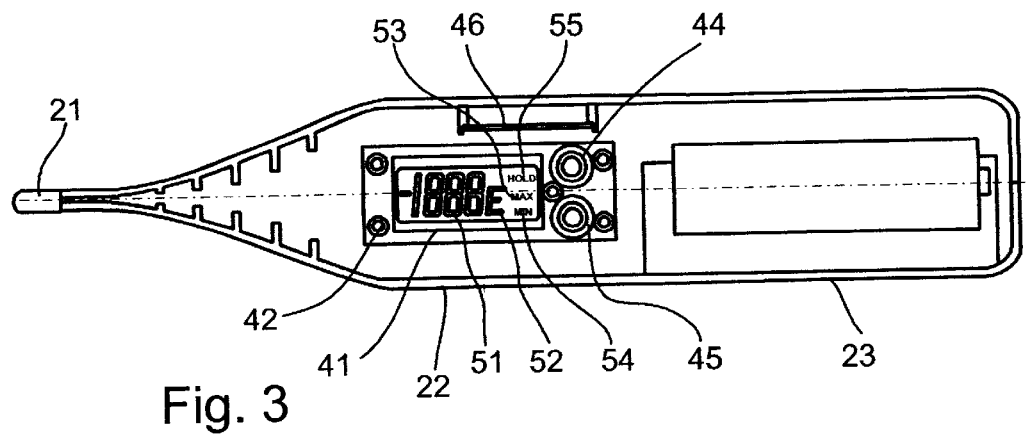
FIG. 3 is a top plan view of the electronic thermometer of FIG. 1.

As shown in FIGS. 1 and 2, housing 20 is of an elongated construction to permit manual grasping by the user. Its end 21 carrying the temperature probe 30 is reduced in dimensions to permit introducing the temperature probe into the body whose temperature is being measured. For example, the electronic thermometer illustrated in the drawings is particularly useful as a clinical thermometer for measuring body temperature of a person, but it may be used in many other applications wherever temperature measurement is required.

The intermediate portion 22 of housing 20 is enlarged with respect to its probe 21 in order to mount the display 40 and the electrical circuitry for controlling it, as will be described more particularly below. The opposite end 23 of housing 20 is further enlarged to define a compartment 24 for receiving batteries 25 in order to power the display 40 and its electrical circuitry. End 23 of housing 20 is closed by a removable cover 26 to provide ready access into the interior of the housing for changing the batteries.

Figure 4:
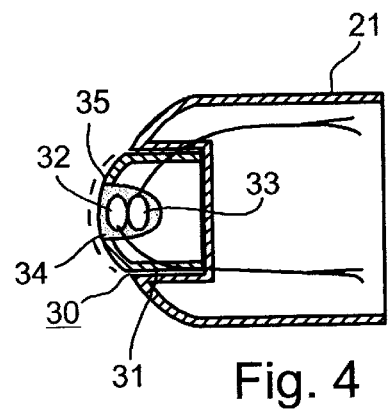
FIG. 4 is an enlarged sectional view illustrating the temperature probe in the electronic thermometer of FIG. 1.

The structure of the temperature probe 30 is more particularly illustrated in FIG. 4. It includes a plastic capsule 31 carried at end 21 of the housing 20. Plastic capsule 31 includes an NTC thermistor 32 having a relatively high electrical resistance at ambient temperature, and a PTC thermistor 33 having a relatively low electrical resistance at ambient temperature. Both thermistors 32 and 33 are embedded within a body 34 of a heat-conductive plastic, with the NTC thermistor 32 facing outwardly and the PTC thermistor 33 facing inwardly.

The heat-conductive plastic body 34 is preferably an epoxy resin having conductive particles, such as metal or carbon. A thin metal coating 35 is applied over the outer surface of the heat-conductive plastic body 34. Metal coating 35 may be of any inert material, such as gold, stainless steel or the like, preferably applied, e.g., by diffusion or vacuum deposition, as a very thin layer or film to provide mechanical protection to the plastic body 34 and the thermistors 32 and 33 embedded within that body.

The display 40 is of the LCD (Liquid Crystal Display) type and includes an LCD panel 41 removably secured to section 22 of the housing 20 by fasteners 42. The display is controlled by electrical circuitry carried on a printed circuit board 43 also secured to section 22 of the housing by fasteners 42. The printed circuit board includes, in addition to the circuitry for driving the display, also the manual control members in the form of two selectively-depressible keys 44, 45. As will be described more particularly below, key 44 is depressed to actuate the electrical circuitry to a Standby Mode, wherein the PTC thermistor 33 (FIG. 4) is effective to preheat the probe to the approximate temperature of the body whose temperature is being measured; and key 45 is depressed to actuate the electrical circuitry to a Measuring Mode, wherein the NTC thermistor 32 is effective to measure the precise temperature of the body.

The electrical circuitry further includes a sound producer in the form of a buzzer 46 effective to produce a sound when either of the two keys 44, 45, is depressed, to confirm to the user the depression of the respective key.

The illustrated thermometer may also be used to input a predetermined maximum temperature and a predetermined minimum temperature, and to produce a signal if the measured temperature is outside of this range. For this purpose, the LCD panel 41 includes a field 51 for displaying the temperature, a field 52 for displaying "C" or "F", a field 53 for displaying the "MAX" temperature, a field 54 for displaying the "MIN" temperature, and a field 55 for displaying "HOLD".

Figure 5:
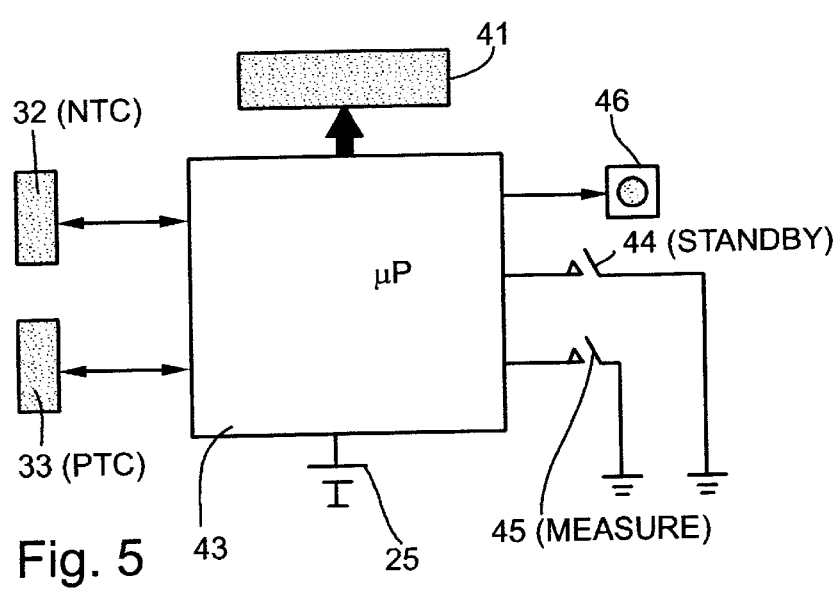
FIG. 5 is a block diagram illustrating the main components in the electrical circuitry of the electronic thermometer of FIG. 1.

The control circuitry carried on the printed circuit board 43 is connected to the above-described elements, as shown schematically in FIG. 5, to control the operation of the electronic thermometer in the following manner:

If it is desired to have the thermometer produce a signal if a predetermined temperature range is exceeded, the thermometer may be actuated to the Temperature Preselect Mode by simultaneously depressing both keys 44 and 45. The maximum temperature of the range may be selected by depressing key 44, and the minimum temperature may be selected by depressing key 45.

Key 44 is depressed alone to produce a Standby Mode of operation, wherein the low-resistance PTC thermistor 33 is used for preheating the probe 30 to the approximate temperature of the body whose temperature is to be measured. When key 44 is depressed, this is confirmed to the user by the actuation of buzzer 46; and when the probe temperature reaches approximately the body temperature, this is indicated by the display "HOLD" in field 55 of the LCD panel 41.

This Standby Mode is maintained until key 45 is depressed, whereupon the electrical circuitry is actuated to the Measuring Mode which is also confirmed by the buzzer 46. In the Measuring Mode, the NTC thermistor 32 is effective to produce a precise measurement of the body temperature. Should the measured temperature be above or below the preselected range as inputted during the Preselect Temperature Mode, this is also indicated by the actuation of the buzzer.

The thermometer may be cleared, in any suitable manner, e.g., by depressing both keys 44, 45 simultaneously twice in quick succession.

It will thus be seen that providing the two thermistors 32, 33 enables each thermistor to perform its function in an optimum manner. Thus, the low resistance of the PTC thermistor 33 enables it to preheat the probe in an optimum manner and in a minimum time during the Standby Mode; whereas the high resistance of the NTC thermistor 32 enables it to produce a precise measurement of the temperature during the Measuring Mode. In addition, the described construction of the probe 30, including the two thermistors embedded in a heat-conductive plastic body 34 having the outer thin conductive layer 35, produces a probe having small mass and a low heat capacity, enabling the probe to respond quickly to temperature changes.

While the invention has been described with respect to one preferred embodiment, it will be appreciated that this is set forth merely for purposes of example, and that many other variations, modifications and applications of the invention may be made.

What is claimed is:

1. An electronic thermometer for measuring the temperature of a body, including a probe having a heating elements for preheating the probe to the approximate temperature of the body, and a temperature measuring element for measuring the precise temperature of the body; characterized in that said heating element is a low-resistance thermistor having a positive temperature coefficient (PTC) for rapidly preheating the probe, and said temperature measuring elements is a high-resistance thermistor having a negative temperature coefficient (NTC) for precisely measuring the temperature of the body.

2. The thermometer according to claim 1, wherein said PTC thermistor and NTC thermistor are embedded in a heat-conductive plastic.

3. The thermometer according to claim 2, wherein said heat-conductive plastic is an epoxy resin having conductive particles.

4. The thermometer according to claim 2, wherein said heat-conductive plastic embedding the PTC and NTC thermistors is covered by an outer layer of an inert metal.

5. The thermometer according to claim 4, wherein said outer layer of an inert metal is in the form of a thin coating applied directly onto said heat-conductive plastic.

6. The thermometer according to claim 1, wherein the resistance at ambient temperature of said NTC thermistor is at least two orders of magnitude larger than that of said PCT thermistor.

7. The thermometer according to claim 6, wherein the resistance at ambient temperature of said PTC thermistor is from 10 to 100 ohms, and the resistance of said NTC thermistor at ambient temperature is from 10 to 100 Kohm.

8. The thermometer according to claim 1, wherein said probe is attached to a housing including a display and electrical circuitry connecting the PTC and NTC thermistors to the display for displaying the measured temperature.

9. The thermometer according to claim 8, wherein said electrical circuitry further includes a manual control adapted to be selectively operated to actuate the electrical circuitry to a Standby Mode wherein the PTC thermistor is effective to preheat the probe to the approximate temperature of the body, and to a Measuring Mode wherein the NTC thermistor is effective to measure the precise temperature of the body.

10. The thermometer according to claim 9, wherein said electrical circuitry further includes a sound producer effective to produce a sound when said manual control is operated to actuate the electrical circuitry to the Standby Mode and Measuring Mode.

11. The thermometer according to claim 9, wherein said manual control includes a first key manually depressible to actuate the electrical circuitry to the Standby Mode, and a second key manually depressible to actuate the electrical circuitry to the Measuring Mode.

12. An electronic thermometer for measuring the temperature of a body, comprising:

a probe including a low-resistance thermistor having a positive temperature coefficient (PTC) for rapidly preheating the probe to the approximate temperature of the body, and a high-resistance thermistor having a negative temperature coefficient (NTC) for precisely measuring the precise temperature of the body;

a housing attached to said probe and including a display and electrical circuitry connected to said PTC and NTC thermistors for displaying the measured temperature;

and a manual control adapted to be selectively operated to actuate said electrical circuitry to a Standby Mode wherein the PTC thermistor is effective to rapidly preheat the probe to the approximate temperature of the body, and to a measuring mode wherein the NTC thermistor is effective to precisely measure the temperature of the body.

13. The thermometer according to claim 12, wherein said electrical circuitry further includes a sound producer effective to produce a sound when said manual control is operated to actuate the electrical circuitry to the Standby Mode and Measuring Mode.

14. The thermometer according to claim 12, wherein said manual control includes a first key manually depressible to actuate the electrical circuitry to the Standby Mode, and a second key manually depressible to actuate the electrical circuitry to the Measuring Mode.

15. The thermometer according to claim 12, wherein the resistance at ambient temperature of said NTC thermistor is at least two orders of magnitude larger than that of said PCT thermistor.

16. The thermometer according to claim 12, wherein the resistance at ambient temperature of said PTC thermistor is from 10 to 100 ohms, and the resistance of said NTC thermistor at ambient temperature is from 10 to 100 Kohm.

17. The thermometer according to claim 12, wherein said PTC thermistor and NTC thermistor are embedded in a heat-conductive plastic.

18. The thermometer according to claim 17, wherein said heat-conductive plastic is an epoxy resin having conductive particles.

19. The thermometer according to claim 17, wherein said heat-conductive plastic embedding the PTC and NTC thermistors is covered by an outer layer of metal.

20. The thermometer according to claim 19, wherein said outer layer of metal is in the form of a thin coating applied directly onto said heat-conductive plastic.

* * * * *